US012122402B2

(12) United States Patent
Kajiwara et al.

(10) Patent No.: US 12,122,402 B2
(45) Date of Patent: Oct. 22, 2024

(54) DRIVING ASSISTANCE DEVICE AND DRIVING ASSISTANCE METHOD

(71) Applicant: HONDA MOTOR CO., LTD., Tokyo (JP)

(72) Inventors: Yugo Kajiwara, Wako (JP); Yuichi Masukake, Wako (JP); Naotaka Kumakiri, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 372 days.

(21) Appl. No.: 17/678,144

(22) Filed: Feb. 23, 2022

(65) Prior Publication Data

US 2022/0297712 A1    Sep. 22, 2022

(30) Foreign Application Priority Data

Mar. 19, 2021    (JP) .................................. 2021-045991

(51) Int. Cl.
*B60W 50/10* (2012.01)
*B60Q 1/34* (2006.01)
(Continued)

(52) U.S. Cl.
CPC ............. *B60W 50/10* (2013.01); *B60Q 1/343* (2013.01); *B60W 30/09* (2013.01); *B60W 40/08* (2013.01);
(Continued)

(58) Field of Classification Search
CPC ...... B60W 50/10; B60W 30/09; B60W 40/08; B60W 2040/0818; B60W 2420/403;
(Continued)

(56) References Cited

U.S. PATENT DOCUMENTS 9,925,987 B1 *   3/2018   Nguyen ............... G08G 1/0129
10,921,813 B2 *  2/2021   Yasuda ................. B60W 10/04
(Continued)

FOREIGN PATENT DOCUMENTS

JP     2012-224119 A     11/2012
JP     2012228954 A      11/2012
(Continued)

OTHER PUBLICATIONS

Japanese Office Action dated Dec. 6, 2022 issued in corresponding Japanese application No. 2021-045991; English machine translation included (10 pages).

*Primary Examiner* — Mussa A Shaawat
(74) *Attorney, Agent, or Firm* — Rankin, Hill & Clark LLP

(57) ABSTRACT

A driving assistance device includes an unable-to-drive state detection unit configured to detect that a driver is in an unable-to-drive state, the unable-to-drive state detection unit being provided in a vehicle, and a stop control unit configured to execute an automatic stop control causing the vehicle to decelerate and stop based on whether the unable-to-drive state is detected by the unable-to-drive state detection unit, wherein the vehicle is provided with an operator configured to operate the vehicle, includes an operation state detection unit configured to detect an operation state of the operator, and cancels the execution of the automatic stop control in a case where the operation state detection unit detects that the operation state of the operator has changed multiple times during transition to the automatic stop control or during the automatic stop control.

3 Claims, 6 Drawing Sheets

(51) Int. Cl.
*B60W 30/09* (2012.01)
*B60W 40/08* (2012.01)
*G06V 20/59* (2022.01)

(52) U.S. Cl.
CPC ... *G06V 20/597* (2022.01); *B60W 2040/0818* (2013.01); *B60W 2420/403* (2013.01); *B60W 2540/106* (2013.01); *B60W 2540/12* (2013.01); *B60W 2540/223* (2020.02)

(58) Field of Classification Search
CPC ....... B60W 2540/106; B60W 2540/12; B60W 2540/223; B60W 2540/10; B60Q 1/343; G06V 20/597; B60K 28/06; B60Y 2302/05; B60T 7/14
See application file for complete search history.

(56) References Cited

U.S. PATENT DOCUMENTS

| | | | | |
|---|---|---|---|---|
| 2007/0260388 | A1* | 11/2007 | Watanabe | B60K 23/0808 701/70 |
| 2016/0114806 | A1* | 4/2016 | Ao | B60K 28/066 348/148 |
| 2016/0229397 | A1* | 8/2016 | Muthukumar | B60W 10/04 |
| 2017/0168502 | A1* | 6/2017 | Gordon | B60W 40/08 |
| 2017/0225689 | A1* | 8/2017 | Mukai | B60W 20/40 |
| 2018/0134262 | A1* | 5/2018 | Kurahashi | B60W 50/12 |
| 2018/0173974 | A1* | 6/2018 | Chang | G06T 5/20 |
| 2018/0253094 | A1* | 9/2018 | Chang | G06V 20/597 |
| 2019/0070957 | A1* | 3/2019 | Nakatsuka | B60W 30/12 |
| 2019/0083022 | A1* | 3/2019 | Huang | A61B 5/024 |
| 2019/0184909 | A1* | 6/2019 | Shiota | A61B 5/18 |
| 2019/0300000 | A1* | 10/2019 | Nakahata | B60W 40/08 |
| 2020/0089225 | A1* | 3/2020 | Sadakiyo | B60W 30/02 |
| 2020/0339131 | A1* | 10/2020 | Olsson | B60W 50/14 |
| 2021/0182617 | A1* | 6/2021 | Kondo | G06V 40/23 |
| 2021/0197835 | A1* | 7/2021 | Maeda | B60W 40/08 |
| 2021/0316738 | A1* | 10/2021 | Iwase | G01C 21/3833 |
| 2021/0347366 | A1* | 11/2021 | Wang | G06V 20/597 |
| 2022/0072953 | A1* | 3/2022 | Liao | B60K 28/04 |

FOREIGN PATENT DOCUMENTS

| | | |
|---|---|---|
| JP | 2014-44707 A | 3/2014 |
| JP | 2017-77823 | 4/2017 |
| JP | 2018-79707 A | 5/2018 |

* cited by examiner

DRIVING ASSISTANCE DEVICE AND DRIVING ASSISTANCE METHOD

INCORPORATION BY REFERENCE

The present application claims priority under 35 U.S.C. § 119 to Japanese Patent Application No. 2021-045991 filed on Mar. 19, 2021. The content of the application is incorporated herein by reference in its entirety.

BACKGROUND OF THE INVENTION

Field of the Invention

The present invention relates to a driving assistance device and a driving assistance method that cancel execution of an automatic stop control by an operation of a driver after a driver abnormality response system included in a vehicle detects an abnormality of the driver.

Description of the Related Art

In recent vehicles, a driver abnormality response system is implemented on a vehicle, the system being configured to stop the vehicle on behalf of a driver as an emergency measure when the driving cannot be continued due to a sudden change in physical condition of a driver. The driver abnormality response system takes a measure such as reducing the speed of the vehicle when detecting an abnormality to stop the vehicle on the side of the road or the like and then providing emergency notification to a hospital or the like. The driver abnormality response system should not provide the function and should be canceled when the driver is in the normal state. However, on the other hand, when the system is canceled at a time when a driver is abnormal, it makes it impossible to provide an original value of the system.

In the technique disclosed in Japanese Patent Laid-Open No. 2017-77823, an automatic stop control unit causes a vehicle to gradually decelerate and performs an automatic stop control in response to detection or estimation of stop intention by a stop intention detection unit or detection or estimation of an unable-to-drive state by an unable-to-drive state detection unit while the vehicle is traveling. Therefore, in a stop control device configured to stop the vehicle when an emergency occurs which makes it difficult for a driver of the vehicle to drive the vehicle due to a health problem or the like of the driver, it is possible to reduce confusion of the driver which may be caused associated with activation or cancellation timing of the automatic stop control and perform the automatic stop control according to the intention of an occupant. However, according to only the technique, the system may be canceled by a pedal depression operation caused from body stiffening such as epilepsy.

The present invention is made in the light of the above-described background, and has an object to provide a driving assistance device that executes cancellation of a driver abnormality response system in response to a plurality of operations intentionally performed by a driver.

SUMMARY OF THE INVENTION

A first inventive aspect to achieve the object described above provides a driving assistance device, including an unable-to-drive state detection unit configured to detect that a driver is in an unable-to-drive state, the unable-to-drive state detection unit being provided in a vehicle, and a stop control unit configured to execute an automatic stop control causing the vehicle to decelerate and stop based on whether the unable-to-drive state is detected by the unable-to-drive state detection unit, wherein the vehicle is provided with an operator configured to operate the vehicle, includes an operation state detection unit configured to detect an operation state of the operator, and cancels the execution of the automatic stop control in a case where the operation state detection unit detects that the operation state of the operator has changed multiple times during transition to the automatic stop control or during the automatic stop control.

The above-described driving assistance device may have a configuration in which the vehicle is provided with an accelerator pedal for operating acceleration or deceleration and a brake pedal, and the operator includes the accelerator pedal and the brake pedal.

The above-described driving assistance device may have a configuration in which the execution of the automatic stop control is canceled in a case where while the stop control unit makes transition to the automatic stop control or executes the automatic stop control, the operation state detection unit detects that the operation state transitions from a first operation state in which the accelerator pedal or the brake pedal is operated to a second operation state in which the accelerator pedal or the brake pedal is not operated, and then within a predetermined period of time, the operation state transitions to the first operation state in which the accelerator pedal or the brake pedal is operated.

The above-described driving assistance device may have a configuration in which the first operation state is a state in which a pedal including the accelerator pedal or the brake pedal is depressed, and the second operation state is a state in which the depressing of the pedal is released.

The above-described driving assistance device may have a configuration in which the first operation state is a state in which depressing of the pedal including the accelerator pedal or the brake pedal is released, and the second operation state is a state in which the pedal is depressed.

The above-described driving assistance device may have a configuration in which the execution of the automatic stop control is canceled, in a case where while the stop control unit makes transition to the automatic stop control or executes the automatic stop control, the operation state detection unit detects that the operation state transitions from a third operation state in which one of the accelerator pedal and the brake pedal is operated to a fourth operation state in which one of the accelerator pedal and the brake pedal is not operated, and then within a predetermined period of time, the operation state transitions to a fifth operation state in which the other of the accelerator pedal and the brake pedal is operated.

The above-described driving assistance device may have a configuration in which the operator is a turn signal indicator switch, and the execution of the automatic stop control is canceled in a case where the operation state detection unit detects that the turn signal indicator switch undergoes an instruction operation in one direction, and then undergoes the instruction operation in the other direction facing the one direction.

The above-described driving assistance device may have a configuration in which the execution of the automatic stop control is canceled, in a case where while the stop control unit makes transition to the automatic stop control or executes the automatic stop control, the operation state detection unit detects that one of the accelerator pedal and the brake pedal is operated at a first operation amount to achieve the first operation state, and then one of the accelerator pedal and the brake pedal is operated at a second operation amount to achieve the first operation state, and the second operation amount is larger than the first operation amount.

A second inventive aspect to achieve the object described above provides a driving assistance method, including an unable-to-drive state detection step of detecting that a driver is in an unable-to-drive state, the unable-to-drive state detection step being provided in a vehicle, and a stop control step of executing an automatic stop control causing the vehicle to decelerate and stop based on whether the unable-to-drive state is detected in the unable-to-drive state detection step, wherein the vehicle is provided with an operator configured to operate the vehicle, includes an operation state detection unit configured to detect an operation state of the operator, and cancels the execution of the automatic stop control in a case where the operation state detection unit detects that the operation state of the operator has changed multiple times during transition to the automatic stop control or during the automatic stop control.

According to the above-described driving assistance device, the automatic stop control can be canceled at an appropriate timing by combining normal driving operations, without requiring any special switching operation. This makes it possible to operate a driver abnormality response system smoothly.

DETAILED DESCRIPTION OF THE PREFERRED EMBODIMENTS

[1-1. Configuration of Driving Assistance Device According to First Embodiment and Automatic Stop Control]

Figure 1:
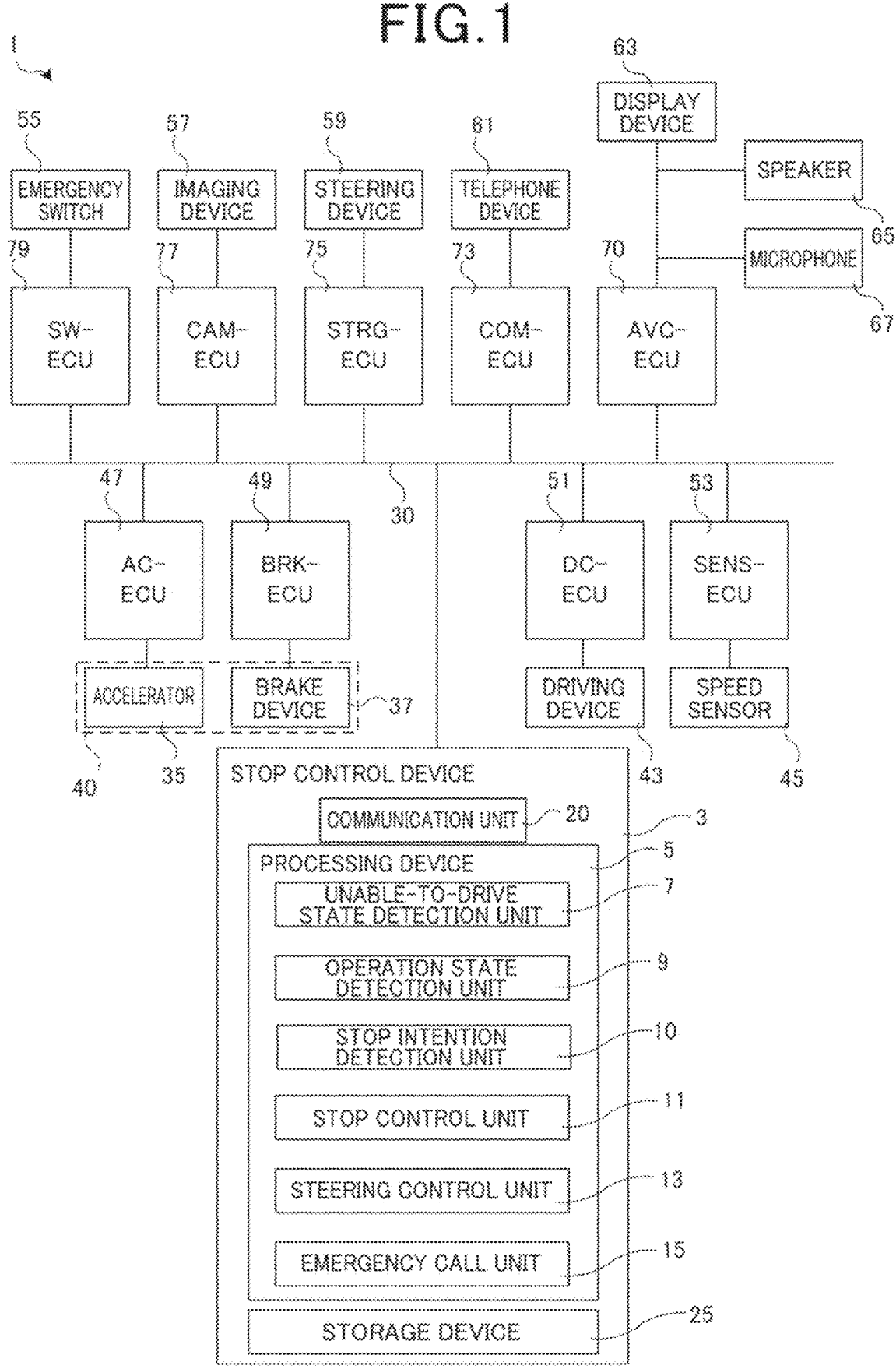
FIG. 1 is a configuration diagram of a driving assistance device according to a first embodiment.

Hereinafter, an embodiment will be described with reference to the drawings. FIG. 1 is a diagram illustrating a configuration of a driving assistance device 1 according to a first embodiment. The driving assistance device 1 includes a plurality of devices installed in a vehicle, electronic control units (ECUs) configured to control the respective devices, and a stop control device 3 configured to execute an automatic stop control. A communication unit 20 of the stop control device 3 is connected to each ECU through a bus 30 for performing data communication. The stop control device 3 includes the communication unit 20, a storage device 25 (memory), and a processing device 5. Here, the communication unit 20 may be a transceiver and a receiver that performs communication according to the control area network (CAN) standard. Hereinafter, a vehicle to be subjected to the automatic stop control by the stop control device 3 is also referred to as a host vehicle or an own vehicle.

For example, the stop control device 3 acquires data including a depression stroke (operation amount) of an accelerator (accelerator pedal) 35 from an accelerator control ECU (AC-ECU) 47 configured to detect an operation on the accelerator pedal 35 performed by a driver, and communicates with a drive control ECU (DC-ECU) 51 configured to control an operation of a driving device 43 to control a vehicle driving force to be generated in the driving device 43. Here, the driving device 43 may be an electric motor or an internal combustion engine that applies a propulsive force to the vehicle, for example. Note that while the driver controls the driving force of the driving device 43 by operating the accelerator 35 in the present embodiment, an accelerator operation device including an arbitrary operation part such as an operation lever may be used instead of the accelerator pedal 35. Specifically, an operator 40 for the driver to perform the operation is provided in the vehicle, and the operator 40 includes the accelerator pedal 35 for the driver to operate acceleration or deceleration, and a brake pedal (brake device) 37.

The stop control device 3 also acquires information related to a pressing state of an emergency switch 55 from a switch control ECU (SW-ECU) 79 configured to detect the pressing state of the emergency switch 55 provided inside a vehicle compartment, and acquires an image through a camera control ECU (CAM-ECU) 77 configured to control an imaging device 57 (camera) configured to capture the image of the vehicle interior or the vehicle exterior. Moreover, the stop control device 3 communicates with a steering control ECU (STRG-ECU) 75 configured to control a steering device 59, to control the steering device 59 so that the vehicle travels within a lane in front of the vehicle, the lane being recognized from the image acquired through the CAM-ECU 77, for example.

The stop control device 3 also communicates with a communication control ECU (COM-ECU) 73 configured to control an external communication device 61 (telephone), to call an emergency critical care center in an emergency and ensure communication by telephone between an occupant of the vehicle and the center, for example. The stop control device 3 also communicates with a brake control ECU (BRK-ECU) 49 configured to control the brake device 37 including a hydraulic brake and an electric parking brake, to control the hydraulic brake to decelerate the own vehicle at a desired deceleration speed, and also to drive the electric parking brake to set the vehicle to a stopped state (parked state) while the vehicle is stopped.

The stop control device 3 also communicates with an audio-visual device control ECU (AVC-ECU) 70, to output an image to a display device 63 (display), output voice to a speaker 65, and/or receive a voice signal from a microphone 67. Note that the display device 63, the speaker 65, and the microphone 67 are provided inside the vehicle compartment of the own vehicle, and provide image information and voice information to the driver and/or the occupant, and acquire voice from the driver and/or the occupant.

Furthermore, the stop control device 3 receives a speed detection signal from a speed sensor 45 configured to detect the speed of the own vehicle through a sensor monitoring ECU (SENS-ECU) 53, and determines whether the own vehicle has been stopped, for example.

The display device 63 may be provided in an instrument panel of a driver's seat, for example. Specifically, the display device 63 is configured as a so-called multi information display (MID) incorporated in a meter panel.

This enables the driver to easily see an image on the display device 63 behind a steering wheel which the driver is holding, through the steering wheel. Note that instead of using the multi information display provided in the meter panel as the display device 63, a navigation system or a display device (not illustrated) of a so-called display audio system provided in the instrument panel may be used as the display device 63.

The emergency switch 55 is provided as a press button switch, for example, in the steering wheel or a ceiling.

In the present embodiment, the driver may transmit a stop intention to the stop control device 3 by pressing the emergency switch 55 when he/she is no longer able to perform a driving operation such as a braking operation due to sudden symptom occurrence or worsening of an illness, for example. Alternatively, an unable-to-drive state detection unit 7 may detect an abnormality of the driver based on the image captured by the imaging device 57 to perform the automatic stop control. Examples of the unable-to-drive state include states captured by the imaging device 57 indicating postures in which the driver bends over backward, leans back, bends the head forward and downward, places the face on the steering wheel, twists only the neck sideways, leans sideways, and falls over sideways.

The processing device 5 of the stop control device 3 is a computer that has a processor such as a central processing unit (CPU), a read only memory (ROM) into which a program is written, a random access memory (RAM) for temporarily storing data, and the like. The processing device 5 includes the unable-to-drive state detection unit 7 configured to detect that a driver is in an unable-to-drive state, a stop control unit 11 configured to execute an automatic stop control causing a vehicle to decelerate and stop based on whether the unable-to-drive state is detected by the unable-to-drive state detection unit, an operation state detection unit 9 configured to detect an operation state of the operator 40, a steering control unit 13 configured to control the steering device 59 (steering) to cause the vehicle to pull to the side of the road, and an emergency call unit 15 configured to perform an emergency call. Specifically, the above-described control is executed by causing the processing device 5, which is a computer, to execute a program stored in the storage device 25.

The driving assistance device 1 according to the present embodiment cancels the execution of the automatic stop control in the case where the operation state detection unit 9 detects that the operation state of the operator 40 has changed multiple times during transition to the automatic stop control or during the automatic stop control.

Each unit described above included in the processing device 5 is implemented by executing a program by the processing device 5 which is a computer, and the computer program may be stored in an arbitrary computer readable storage device 25. Instead of or in addition to this, all or some of the above-described units may be each configured of hardware including one or more electronic circuit components.

The stop intention detection unit 10 implemented by the processing device 5 refers to the SW-ECU 79 at predetermined intervals for the pressing state of the emergency switch 55 to acquire information on the pressing state. When the emergency switch 55 is pressed, the stop intention detection unit 10 outputs a signal (stop intension detection signal) notifying that the emergency switch 55 has been pressed to the stop control unit 11. Instead, when the emergency switch 55 has been pressed, the SW-ECU 79 may transmit a signal (SW pressed signal) indicating that the emergency switch 55 has been pressed to the stop intention detection unit 10. Then, upon receipt of the SW pressed signal, the stop intention detection unit 10 may output a stop intention detection signal to the stop control unit 11.

The unable-to-drive state detection unit 7 acquires an operation amount (depression stroke) of the accelerator pedal 35 at predetermined intervals through the AC-ECU 47. The unable-to-drive state detection unit 7 acquires an operation amount (depression stroke) of the brake pedal 37 at predetermined intervals through the BRK-ECU 49. When detecting the operation performed by the operator 40, e.g., detecting that the depression stroke of the accelerator pedal 35 is reduced, the unable-to-drive state detection unit 7 activates a measuring timer to determine whether the cancellation of the automatic stop control is established, based on the time at which the depression stroke has been reduced. A cancellation operation of the automatic stop control to be performed by the driving assistance device 1 will be described in detail with reference to FIGS. 5 and 6.

The stop control unit 11 executes the automatic stop control controlling the deceleration speed of an own vehicle to stop the own vehicle automatically, based on whether a stop intention detection signal has been received from the stop intention detection unit 10 and/or whether an unable-to-drive state detection signal has been received from the unable-to-drive state detection unit 7.

More specifically, upon receipt of any one of the stop intention detection signal from the stop intention detection unit 10 and the unable-to-drive state detection signal from the unable-to-drive state detection unit 7, the stop control unit 11 starts the automatic stop control and controls the brake device 37 and the driving device 43 through the BRK-ECU 49 and the DC-ECU 51, to decelerate the vehicle.

[1-2. Operation of Operator for Canceling Automatic Stop Control]

A specific example of an operation of the operator 40 to be performed by a driver to cancel the automatic stop control will be described with reference to FIGS. 2 and 3.

Figure 2:
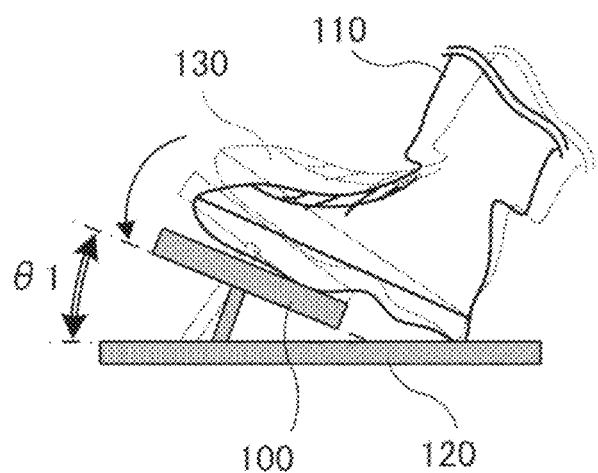
FIG. 2 is a diagram illustrating an aspect in which an operator is depressed.
Figure 3:
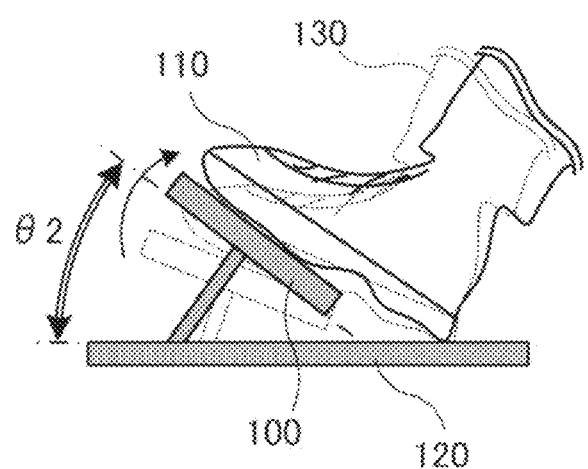
FIG. 3 is a diagram illustrating an aspect in which the depressing of the operator is released.

FIGS. 2 and 3 each are a diagram illustrating an aspect in which the operator 40 is depressed with a foot 110 of the driver. An operator (pedal) 100 may be the accelerator pedal 35 or the brake device (brake pedal) 37.

Here, the operator 100 is a brake pedal.

In FIG. 2, the driver depresses the operator 100 with the foot 110, and the operator 100 achieves a first operation state in which an angle between the operator 100 and a floor 120 is, for example, an angle $\theta 1$.

Next, in FIG. 3, the driver releases the depressing with the foot 110 of the driver, and the operator 100 achieves a second operation state in which the angle between the operator 100 and the floor 120 is, for example, an angle $\theta 2$. Here, the angle $\theta 2$ is larger than the angle $\theta 1$, and therefore, the depression stroke of the pedal is small.

Then, when the driver deeply depresses with the driver's foot 110 again within a predetermined period of time from when the operator 100 achieves the second operation state, the operator 100 achieves the first operation state in which the angle between the operator 100 and the floor 120 is the angle $\theta 1$ (return to FIG. 2). Needless to say, even when the angle is not strictly returned to $\theta 1$ at this time, it is enough that the operator 100 is deeply depressed so that the operation amount becomes equal to or more than a certain amount.

As described above, the driving assistance device 1 according to the present embodiment cancels the execution of the automatic stop control, in the case where while the stop control unit makes the transition to the automatic stop control or executes the automatic stop control, the operation state detection unit 9 detects that the operation state transitions from the first operation state in which the accelerator pedal 35 or the brake pedal 37 is operated to the second operation state in which the accelerator pedal 35 or the brake pedal 37 is not operated, and then within a predetermined period of time, the operation state transitions to the first operation state in which the accelerator pedal 35 or the brake pedal 37 is operated. Here, the second operation state in which the accelerator pedal 35 or the brake pedal 37 is not operated does not means that no pedal is depressed, but rather means that the depression stroke of the operator 40 is small. That is, the first operation state is a state in which the pedal is depressed, and the second operation state is a state in which the depressing of the pedal is released. The predetermined period of time is, for example, two seconds.

Here, although the aspect has been described in which the execution of the automatic stop control is canceled only by a change in the pedal depression operation of the brake pedal 37, the execution of the automatic stop control may be canceled in response to detection of a change in the depression operation of the accelerator pedal 35 by the operation state detection unit 9. At this time, the first state may be a state in which the stroke depressed with the foot 110 of the driver is small, and the second state may be a state in which the stroke depressed with the foot 110 of the driver is large. That is, the first operation state may be in a state in which the depressing of the pedal is released, and the second operation state may be a state in which the pedal is depressed.

Alternatively, the driving assistance device 1 may cancel the execution of the automatic stop control, in the case where the operation state detection unit 9 detects that the operation state transitions from the first operation state in which the accelerator pedal 35 is operated to the second operation state in which the brake pedal 37 is not operated, and then within a predetermined period of time, the operation state transitions to the first operation state in which the accelerator pedal 35 is operated.

Alternatively, the driving assistance device 1 may cancel the execution of the automatic stop control, in the case where the operation state detection unit 9 detects that the operation state transitions from the first operation state in which the brake pedal 37 is operated to the second operation state in which the accelerator pedal 35 is not operated, and then within a predetermined period of time, the operation state transitions to the first operation state in which the brake pedal 37 is operated.

That is, a configuration may be adopted in which the execution of the automatic stop control is canceled, in the case where while the stop control unit 11 makes the transition to the automatic stop control or executes the automatic stop control, the operation state detection unit 9 detects that the operation state transitions from a third operation state in which one of the accelerator pedal 35 and the brake pedal 37 is operated to a fourth operation state in which one of the accelerator pedal 35 and the brake pedal 37 is not operated, and then within a predetermined period of time, the operation state transitions to a fifth operation state in which the other of the accelerator pedal 35 and the brake pedal 37 is operated.

[1-3. Operation of Driving Assistance Device when Automatic Stop Control is Canceled]

Figure 5:
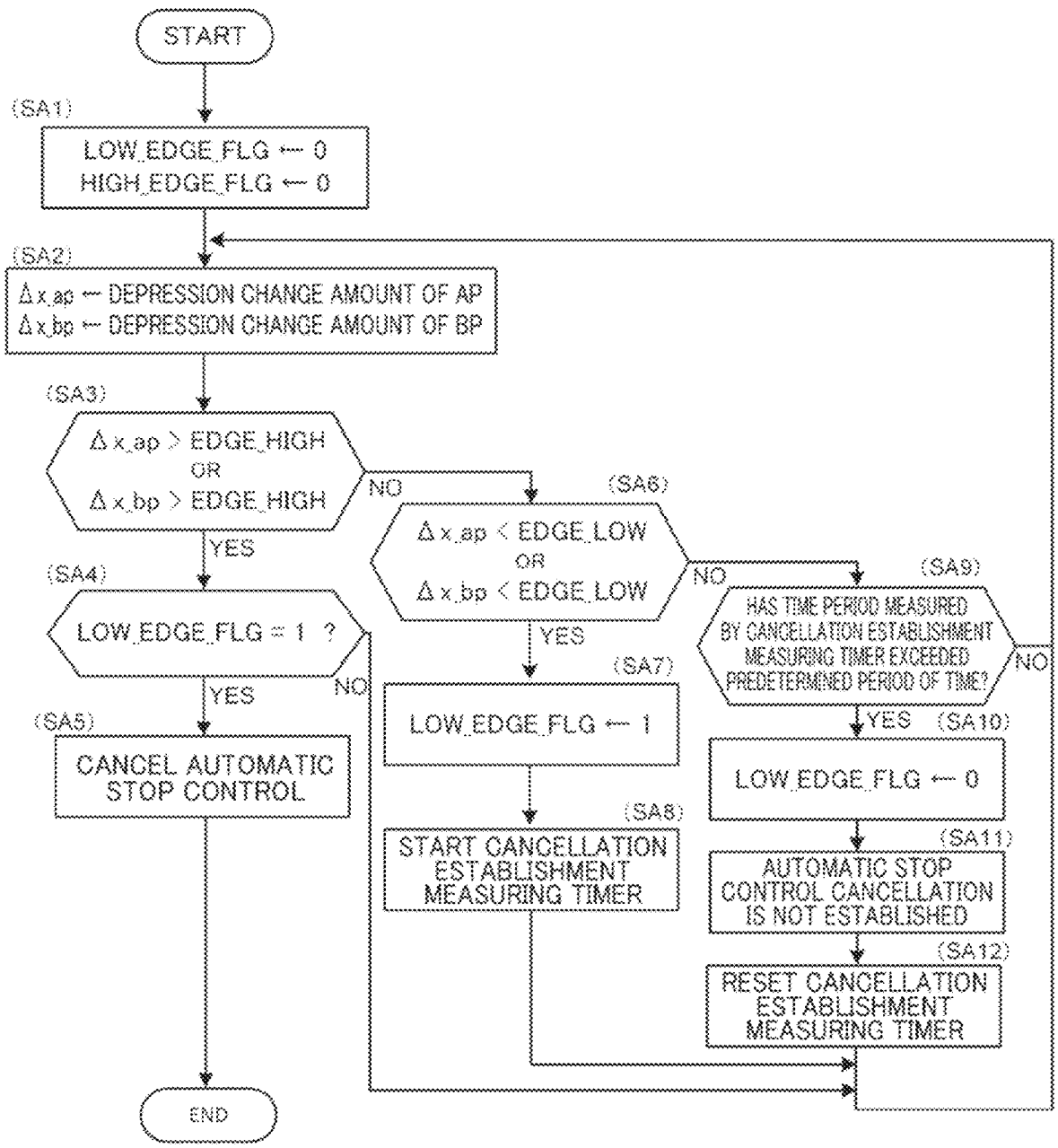
FIG. 5 is a flowchart illustrating an operation of the driving assistance device.

FIG. 5 is a flowchart illustrating an operation of the driving assistance device 1 when the automatic stop control is canceled. In the flowchart, the accelerator 35 is expressed as AP or ap, and the brake device 37 is expressed as BP or bp.

EDGE_HIGH refers to a state in which a depression stroke of the operator (pedal) 100 is large, that is, the depression stroke is a pedal operation amount used to determine whether the operator (pedal) 100 is in the first state, for example, a driver depresses the operator (pedal) (100) to reach an operation amount corresponding to the angle θ1 based on FIG. 2. EDGE_LOW refers to a state in which a depression stroke of the operator (pedal) 100 is small, that is, the depression stroke is a pedal operation amount used to determine whether the operator (pedal) 100 is in the second state, for example, a driver releases the depressing of the operator (pedal) (100) to reach an operation amount corresponding to the angle θ2 based on FIG. 3.

Here, although $\Delta x\_bp$ which is a change in the depression stroke of the brake pedal 37 is described, in each step, the change in the depression stroke of the brake pedal 37 may be rephrased as $\Delta x\_ap$ which is a change in the depression stroke of the accelerator pedal 35.

In addition, LOW_EDGE_FLG refers to a variable which is 1 when the change in the depression stroke achieves the second state or which is 0 in other cases, and HIGH_EDGE_FLG refers to a variable which is 1 when the change in the depression stroke achieves the first state or which is 0 in the other cases.

First, the driving assistance device 1 inputs 0, which is an initial value, to LOW_EDGE_FLG and HIGH_EDGE_FLG (step SA1).

Next, the driving assistance device 1 inputs a change in the depression stroke of the brake device 37 to the variable $\Delta x\_bp$ (step SA2). The driving assistance device 1 determines whether $\Delta x\_bp$ is larger than EDGE_HIGH (step SA3). When $\Delta x\_bp$ is larger than EDGE_HIGH (step SA3: YES), the driving assistance device 1 determines whether LOW_EDGE_FLG is 1 (step SA4). When LOW_EDGE_FLG is 1 (step SA4: YES), the driving assistance device 1 cancels the execution of the automatic stop control (step SA5). Specifically, the driving assistance device 1 cancels the execution of the automatic stop control in the case where the brake device 37 transitions from the second state in which the depressing of the brake device 37 is released to the first state in which the depressing stroke is large.

When $\Delta x\_bp$ is equal to or smaller than EDGE_HIGH (step SA3: NO), the driving assistance device 1 determines whether $\Delta x\_bp$ is smaller than EDGE_LOW (step SA6). When $\Delta x\_bp$ is smaller than EDGE_LOW (step SA6: YES), the driving assistance device 1 inputs 1 to LOW_EDGE_FLG (step SA7). Then, a cancellation establishment measuring timer starts measurement of a time period required for the brake device 37 to transition from the second state to the first state again, the time period being used to determine whether the cancellation is established (step SA8). Then, the process returns to step SA2.

When $\Delta x\_bp$ is equal to or larger than EDGE_LOW (step SA6: NO), the driving assistance device 1 determines whether the time period measured by the cancellation establishment measuring timer has exceeded a predetermined period of time (step SA9). The predetermined period of time is, for example, two seconds. When the time period measured by the cancellation establishment measuring timer has exceeded the predetermined period of time of longer (step SA9: YES), that is, the predetermined period of time has elapsed before the brake device 37 transitions from the second state to the first state again, 0 is input to LOW_EDGE_FLG (step SA10), and the cancellation of the automatic stop control is not established (step SA11). Then, the cancellation establishment measuring timer is reset (step SA12), and the process returns to step SA2.

When the time period measured by the cancellation establishment measuring timer is less than the predetermined period of time (step SA9: NO), that is, the predetermined period of time is not required for the brake device 37 to transition from the second state to the first state again, the process returns to step SA2.

Through the foregoing flow, the driving assistance device 1 performs an operation for canceling the execution of the automatic stop control, in the case where the operation state detection unit 9 detects that the brake device 37 transitions to the first state in which the depression stroke is large again within the predetermined time period after the brake device 37 transitions from the first state in which the depression stroke is large to the second state in which the depression stroke is small. Note that a series of operations may be implemented by executing the program by the processing device 5 of the driving assistance device 1.

[2-1. Configuration of Driving Assistance Device According to Second Embodiment and Operation of Operator]

Hereinafter, a second embodiment will be described with reference to the drawing.

Note that a configuration of a driving assistance device 1 according to the second embodiment is similar to that of the driving assistance device 1 according to the first embodiment, and the description will be omitted.

[2-2. Operation of Operator for Canceling Automatic Stop Control]

A specific example of an operation of an operator 40 to be performed by a driver to cancel the automatic stop control will be described with respect to the driving assistance device 1 according to the second embodiment, with reference to FIGS. 2 to 4.

Figure 4:
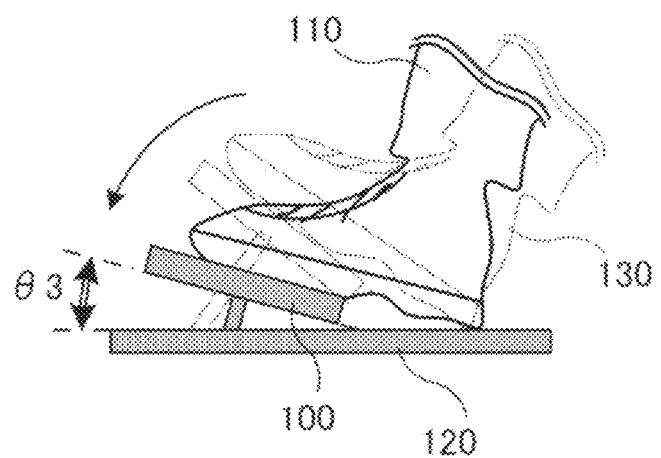
FIG. 4 is a diagram illustrating an aspect in which the operator is largely depressed.

FIGS. 2 to 4 each are a diagram illustrating an aspect in which the operator 40 is depressed with a foot 110 of the driver. An operator 100 may be an accelerator pedal 35 or a brake device (brake pedal) 37. Here, the operator 100 is a brake pedal.

In the present embodiment, the driving assistance device 1 determines whether the automatic stop control can be canceled, based on a difference in the depression operation amount of the operator 100. Specifically, for example, it is assumed that an operation state detection unit 9 detects that the driver deeply depresses the brake device 37 first at a first operation amount in which the angle between the operator 100 and a floor 120 is, for example, an angle θ1 as illustrated in FIG. 2. Then, the driving assistance device 1 cancels the execution of the automatic stop control, in the case where the operation state detection unit 9 detects that the driver releases the depressing so that the angle between the operator 100 and the floor 120 is, for example, and angle θ2 (see FIG. 3), and then the driver depresses the brake device 37 more deeply at a second operation amount in which the angle between the operator 100 and the floor 120 is, for example, an angle θ3 as illustrated in FIG. 4 within a predetermined period of time from when the depressing is released, specifically, in the case where the angle θ3 is smaller the angle θ1.

In other words, the driving assistance device 1 in the present embodiment cancels the execution of the automatic stop control, in the case where while the stop control unit 11 makes the transition to the automatic stop control or executes the automatic stop control, the operation state detection unit 9 detects that one of the accelerator pedal 35 and the brake pedal 37 is operated at the first operation amount to achieve the first operation state, and then one of the accelerator pedal 35 and the brake pedal 37 is operated at the second operation amount to achieve the first operation state, and the second operation amount is larger than the first operation amount.

[2-2. Operation of Driving Assistance Device when Automatic Stop Control is Canceled]

Figure 6:
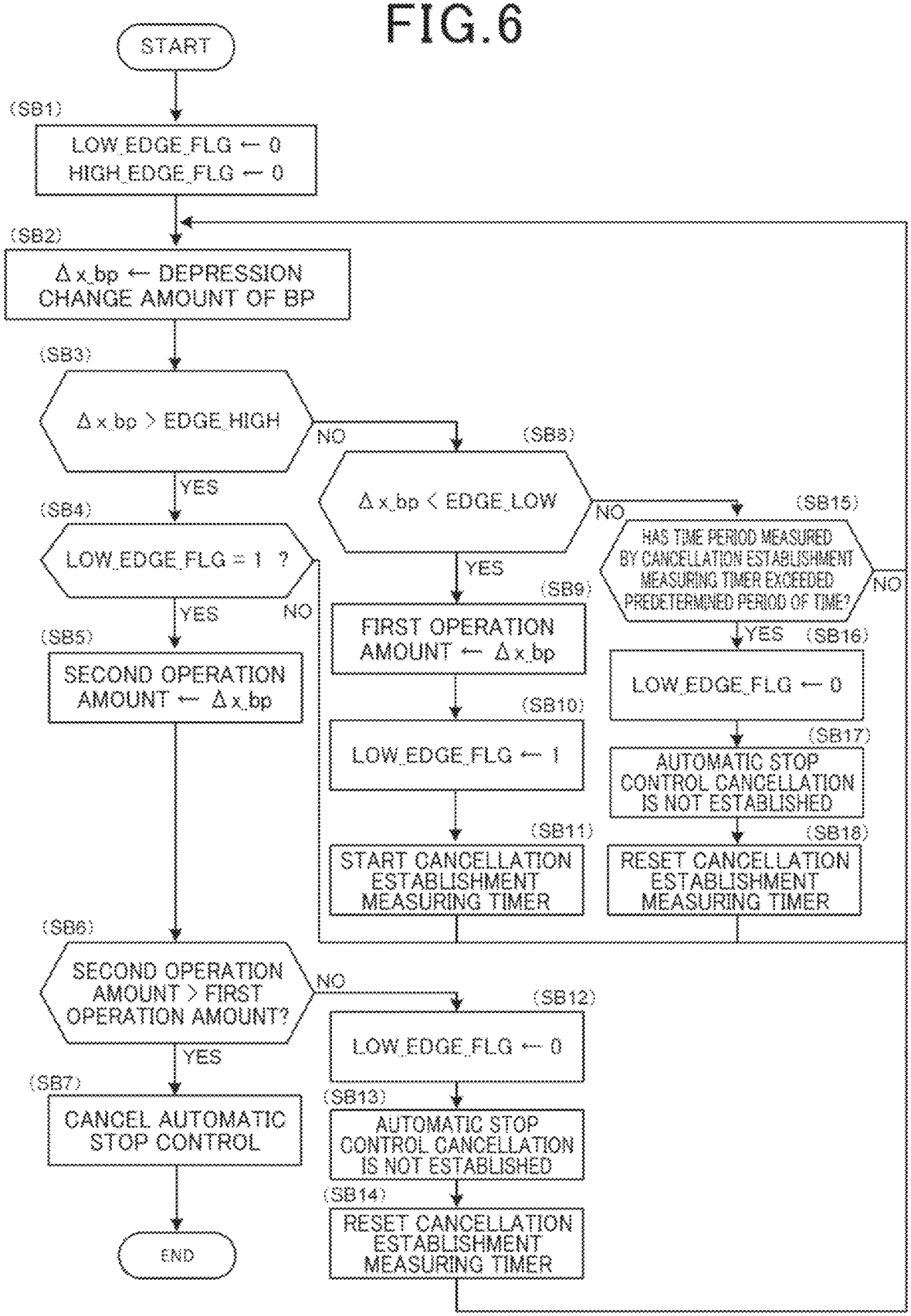
FIG. 6 is a configuration diagram illustrating a driving assistance device according to a second embodiment.

FIG. 6 is a flowchart illustrating an operation of the driving assistance device 1 when the automatic stop control is canceled, in the driving assistance device 1 according to the second embodiment. In the flowchart, the accelerator 35 is expressed as AP or ap, and the brake device 37 is expressed as BP or bp. EDGE_HIGH refers to a state in which a depression stroke of the operator (pedal) 100 is large, that is, the depression stroke is a pedal operation amount used to determine whether the operator (pedal) 100 is in the first state, for example, a driver depresses the operator (pedal) (100) to reach an operation amount corresponding to the angle θ1 based on FIG. 2. EDGE_LOW refers to a state in which a depression stroke of the operator (pedal) 100 is small, that is, the depression stroke is a pedal operation amount used to determine whether the operator (pedal) 100 is in the second state, for example, a driver releases the depressing of the operator (pedal) (100) to reach an operation amount corresponding to the angle θ2 based on FIG. 3.

Here, although $\Delta x\_bp$ which is a change in the depression stroke of the brake device 37 is described, in each step, the change in the depression stroke of the brake device 37 may be rephrased as $\Delta x\_ap$ which is a change in the depression stroke of the accelerator 35.

In addition, LOW_EDGE_FLG refers to a variable which is 1 when the change in the depression stroke achieves the second state or which is 0 in other cases, and HIGH_EDGE_FLG refers to a variable which is 1 when the change in the depression stroke achieves the first state or which is 0 in the other cases.

First, the driving assistance device 1 inputs 0, which is an initial value, to LOW_EDGE_FLG and HIGH_EDGE_FLG (step SB1).

Next, the driving assistance device 1 inputs a change in the depression stroke of the brake device 37 to the variable $\Delta x\_bp$ (step SB2). The driving assistance device 1 determines whether $\Delta x\_bp$ is larger than EDGE_HIGH (step SB3). When $\Delta x\_bp$ is larger than EDGE_HIGH (step SB3: YES), the driving assistance device 1 determines whether LOW_EDGE_FLG is 1 (step SB4).

When LOW_EDGE_FLG is 1 (step SB4: YES), the driving assistance device 1 inputs $\Delta x\_bp$ to the second operation amount (step SB5).

The second operation amount is compared with the first operation amount (step SB6). When the second operation amount is larger than the first operation amount (step SB6: YES), the driving assistance device 1 cancels the execution of the automatic stop control (step SB7). Specifically, the driving assistance device 1 cancels the execution of the automatic stop control in the case where the brake device 37 transitions from the second state in which the depressing of the brake device 37 is released to the first state in which the depressing stroke is large.

When the second operation amount is equal to or smaller than the first operation amount or the first operation amount is not input (step SB6: NO), the driving assistance device 1 inputs 0 to LOW_EDGE_FLG (step SB12), and the driving assistance device 1 does not establish the cancellation of the automatic stop control (step SB13). Then, the automatic stop control cancellation establishment measuring timer is reset (step SB14), and the process returns to step SB2.

When LOW_EDGE_FLG is 0 (step SB4: NO), the process returns to step SB2.

When $\Delta x\_bp$ is equal to or smaller than EDGE_HIGH (step SB3: NO), the driving assistance device 1 determines whether Δx_bp is smaller than EDGE_LOW (step SB8). When Δx_bp is smaller than EDGE_LOW (step SB8: YES), the driving assistance device 1 inputs Δx_bp to the first operation amount (step SB9), and inputs 1 to LOW_EDGE_FLG (step SB10). Then, the cancellation establishment measuring timer starts measurement of a time period required for the brake device 37 to transition from the second state to the first state again, the time period being used to determine whether the cancellation is established (step SB11). Then, the process returns to step SB2.

When Δx_bp is equal to or larger than EDGE_LOW (step SB8: NO), the driving assistance device 1 determines whether the time period measured by the cancellation establishment measuring timer has exceeded a predetermined period of time (step SB15). The predetermined period of time is, for example, two seconds. When the time period measured by the cancellation establishment measuring timer has exceeded the predetermined period of time of longer (step SB15: YES), that is, the predetermined period of time has elapsed before the brake device 37 transitions from the second state to the first state again, 0 is input to LOW_EDGE_FLG (step SB16), and the cancellation of the automatic stop control is not established (step SB17). Then, the cancellation establishment measuring timer is reset (step SB18), and the process returns to step SB2.

When the time period measured by the cancellation establishment measuring timer is less than the predetermined period of time (step SB15: NO), that is, the predetermined period of time is not required for the brake device 37 to transition from the second state to the first state again, the process returns to step SB2.

Through the foregoing flow, the driving assistance device 1 performs an operation for canceling the execution of the automatic stop control, in the case where the operation state detection unit 9 detects that the brake device 37 transitions to the state in which the brake pedal 37 is deeply depressed at the second operation amount larger than the first operation amount again within the predetermined time period after the brake device 37 transitions from the first state in which the brake device 37 is operated at the first operation amount to the second state in which the depression stroke is small. Note that a series of operations may be implemented by executing the program by the processing device 5 of the driving assistance device 1.

3. Driving Assistance Method According to Third Embodiment

A driving assistance method according to a third embodiment includes an unable-to-drive state detection step of detecting that a driver is in an unable-to-drive state, the unable-to-drive state detection step being provided in a vehicle, and a stop control step of executing an automatic stop control causing the vehicle to decelerate and stop based on whether the unable-to-drive state is detected in the unable-to-drive state detection step, wherein the vehicle is provided with an operator configured to operate the vehicle, includes an operation state detection unit configured to detect an operation state of the operator, and cancels the execution of the automatic stop control in a case where the operation state detection unit detects that the operation state of the operator has changed multiple times during transition to the automatic stop control or during the automatic stop control.

4. Other Embodiments

Although in the above-described embodiments, an example has been described in which the accelerator 35 or the brake device (brake pedal) 37 is operated as the operator 40 configured to perform an operation for canceling the execution of the automatic stop control, in the present invention, the other device may be used as the operator. Specifically, the operator 40 is a turn signal indicator switch, and it is conceivable that the execution of the automatic stop control is canceled in the case where the operation state detection unit 9 detects that the turn signal indicator switch undergoes an instruction operation in one direction, and then undergoes the instruction operation in the other direction facing the one direction. It is also conceivable that the steering device 59 is used as the operator 40.

5. Configurations Supported by the Above-Described Embodiments

The above-described embodiments support the following configurations.

(Configuration 1) A driving assistance device, including an unable-to-drive state detection unit 7 configured to detect that a driver is in an unable-to-drive state, the unable-to-drive state detection unit being provided in a vehicle, and a stop control unit 11 configured to execute an automatic stop control causing the vehicle to decelerate and stop based on whether the unable-to-drive state is detected by the unable-to-drive state detection unit 7, wherein the vehicle is provided with an operator 40 configured to operate the vehicle, includes an operation state detection unit 9 configured to detect an operation state of the operator 40, and cancels the execution of the automatic stop control in a case where the operation state detection unit 9 detects that the operation state of the operator 40 has changed multiple times during transition to the automatic stop control or during the automatic stop control.

When the automatic stop control is canceled simply because the operation state has changed from the state in which the operator is operated to the state in which the operator is not operated, the automatic stop control may be canceled although the driver is in the unable-to-drive state. Therefore, to cancel the automatic stop control, it is necessary to intentionally operate the operator multiple times to detect the intention of an occupant, which makes it possible to cancel the automatic stop control. According to the driving assistance device of configuration 1, the automatic stop control can be canceled at an appropriate timing by combining normal driving operations, without requiring any special switching operation.

(Configuration 2) The driving assistance device according to configuration 1, wherein the vehicle is provided with an accelerator pedal 35 for operating acceleration or deceleration and a brake pedal 37, and the operator 40 includes the accelerator pedal 35 and the brake pedal 37.

According to the driving assistance device of configuration 2, the automatic stop control can be canceled by combining normal driving operations, without requiring any special switching operation. The occupant can cancel the automatic stop control smoothly even in an emergency.

(Configuration 3) The driving assistance device according to configuration 2, wherein the execution of the automatic stop control is canceled in a case where while the stop control unit 11 makes transition to the automatic stop control or executes the automatic stop control, the operation state detection unit 9 detects that the operation state transitions from a first operation state in which the accelerator pedal 35 or the brake pedal 37 is operated to a second operation state in which the accelerator pedal 35 or the brake pedal 37 is not operated, and then within a predetermined period of time, the operation state transitions to the first operation state in which the accelerator pedal 35 or the brake pedal 37 is operated.

According to the driving assistance device of configuration 3, it makes it possible to clearly distinguish between a case where the driver keeps the pedal to the metal due to body stiffening such as epilepsy and a case where the driver intends to cancel the execution of the automatic stop control. This makes it possible to reduce the possibility that driver abnormality response system cannot be operated when the drive abnormality response system is to be operated, and to provide a vehicle in which the driver abnormality response system is used to make it easy for the driver to cancel the execution of the automatic stop control, when desired.

(Configuration 4) The driving assistance device according to configuration 3, wherein the first operation state is a state in which a pedal including the accelerator pedal or the brake pedal is depressed, and the second operation state is a state in which the depressing of the pedal is released.

According to the driving assistance device of configuration 4, the automatic stop control can be canceled timing by combining normal driving operations, without requiring any special switching operation. The occupant can cancel the automatic stop control smoothly even in an emergency.

(Configuration 5) The driving assistance device according to configuration 3, wherein the first operation state is a state in which depressing of a pedal including the accelerator pedal or the brake pedal is released, and the second operation state is a state in which the pedal is depressed.

According to the driving assistance device of configuration 5, the automatic stop control can be canceled by combining normal driving operations, without requiring any special switching operation. Therefore, the occupant can cancel the automatic stop control smoothly even in an emergency.

(Configuration 6) The driving assistance device according to configuration 3, wherein the execution of the automatic stop control is canceled in a case where while the stop control unit 11 makes transition to the automatic stop control or executes the automatic stop control, the operation state detection unit 9 detects that the operation state transitions from a third operation state in which one of the accelerator pedal 35 and the brake pedal 37 is operated to a fourth operation state in which one of the accelerator pedal 35 and the brake pedal 37 is not operated, and then within a predetermined period of time, the operation state transitions to a fifth operation state in which the other of the accelerator pedal 35 and the brake pedal 37 is operated.

Since the driver may unintentionally depress the same pedal again if the driver falls into a fit of convulsions, the driver may cancel the execution of the automatic stop control by mistake. However, according to the driving assistant device of configuration 6, to cancel the automatic stop control, it is necessary to issue an instruction to alternately depress a plurality of different pedals, which makes it possible to detect the intention of the driver with high accuracy to execute the cancellation of the automatic stop control.

(Configuration 7) The driving assistance device according to configuration 1, wherein the operator is a turn signal indicator switch, and the execution of the automatic stop control is canceled in a case where the operation state detection unit 9 detects that the turn signal indicator switch undergoes an instruction operation in one direction, and then undergoes the instruction operation in the other direction facing the one direction.

According to the driving assistance device of configuration 7, the turn signal indicator switch can be used to cancel the execution of the automatic stop control. Therefore, the automatic stop control can be canceled by combining normal driving operations, without requiring any special switching operation. Therefore, the occupant can cancel the automatic stop control smoothly even in an emergency.

(Configuration 8) The driving assistance device according to any one of configurations 3 to 5, wherein the execution of the automatic stop control is canceled, in a case where while the stop control unit makes transition to the automatic stop control or executes the automatic stop control, the operation state detection unit detects that one of the accelerator pedal and the brake pedal is operated at a first operation amount to achieve the first operation state, and then one of the accelerator pedal and the brake pedal is operated at a second operation amount to achieve the first operation state, and the second operation amount is larger than the first operation amount.

According to the driving assistant device of configuration 8, to cancel the automatic stop control, it is necessary to issue an instruction based on a change in the depression operation amount of the pedal, which makes it possible to detect the intention of the driver with high accuracy to execute the cancellation of the automatic stop control.

(Configuration 9) A driving assistance method, including an unable-to-drive state detection step of detecting that a driver is in an unable-to-drive state, the unable-to-drive state detection step being provided in a vehicle, and a stop control step of executing an automatic stop control causing the vehicle to decelerate and stop based on whether the unable-to-drive state is detected in the unable-to-drive state detection step, wherein the vehicle is provided with an operator configured to operate the vehicle, includes an operation state detection unit configured to detect an operation state of the operator, and cancels the execution of the automatic stop control in a case where the operation state detection unit detects that the operation state of the operator has changed multiple times during transition to the automatic stop control or during the automatic stop control.

When the automatic stop control is canceled simply because the operation state has changed from the state in which the operator is operated to the state in which the operator is not operated, the automatic stop control may be canceled although the driver is in the unable-to-drive state. Therefore, to cancel the automatic stop control, it is necessary to intentionally operate the operator multiple times to detect the intention of an occupant, which makes it possible to cancel the automatic stop control. According to the driving assistance device of configuration 9, the automatic stop control can be canceled at an appropriate timing.

The embodiments have been described as exemplifications of the techniques disclosed in the present application. However, the techniques in the present disclosure are not limited thereto, and are also applicable to embodiments in which modifications, replacements, additions, omissions and the like are made. Additionally, the constituent elements described in the above-described embodiments can be combined to provide a new embodiment.

For example, step units of control operations illustrated in FIGS. 5 and 6 are classified according to main processing contents to facilitate the understanding of operation of each unit of the driving assistance device 1 and the present invention is never limited by the way how to divide the processing units or the names. The step units of operation may be divided into still more step units according to the processing contents. The step units of operation may be divided such that one step unit includes still more processes. The order of steps may be switched around as appropriate without departing from the sprit and scope of the present invention.

REFERENCE SIGNS LIST

1 Driving assistance device
3 Stop control device
5 Processing device
7 Unable-to-drive state detection unit
9 Operation state detection unit
10 Stop intention detection unit
11 Stop control unit
13 Steering control unit
15 Emergency call unit
20 Communication unit
25 Storage device
30 Bus
35 Accelerator (Accelerator pedal)
37 Brake device (Brake pedal)
40 Operator
43 Driving device
45 Speed sensor
47 AC-ECU
49 BRK-ECU
51 DC-ECU
53 SENS-ECU
55 Emergency switch
57 Imaging device
59 Steering device
61 External communication device
63 Display device
65 Speaker
67 Microphone
70 AVC-ECU
73 COM-ECU
75 STRG-ECU
77 CAM-ECU
79 SW-ECU
100 Operator (Pedal)
110 Foot of driver
120 Floor
130 Foot of driver

What is claimed is:

1. A driving assistance device comprising a processor that:
   detects that a driver of a vehicle is in an unable-to-drive state; and
   executes an automatic stop control causing the vehicle to decelerate and stop based on whether the unable-to-drive state is detected,
   wherein the vehicle is provided with an operator configured to operate the vehicle,
   the operator includes an accelerator pedal for operating acceleration or deceleration and a brake pedal,
   the processor:
   detects an operation state of the operator; and
   when in a transition to the automatic stop control or when in executing the automatic stop control, cancels the execution of the automatic stop control when the processor:
   detects that the operation state transitions from a first operation state in which the accelerator pedal or the brake pedal is operated and an angle between the accelerator pedal or the brake pedal with a floor of the vehicle is at a first angle to a second operation state in which depression of the accelerator pedal or the brake pedal is released so that the angle between the accelerator pedal or the brake pedal and the floor of the vehicle becomes a second angle larger than the first angle; and
   then detects that, within a predetermined period of time, the operation state transitions to a third operation state in which the angle between the accelerator pedal or the brake pedal and the floor of the vehicle is at a third angle smaller than the first angle.

2. The driving assistance device according to claim 1, wherein
   the processor cancels execution of the automatic stop control in a case where while the processor makes transition to the automatic stop control or executes the automatic stop control, the processor detects that the operation state transitions from the third operation state in which one of the accelerator pedal and the brake pedal is operated to a fourth operation state in which the accelerator pedal or the brake pedal which is operated in the third operation state is not operated, and then within a predetermined period of time, the operation state transitions to a fifth operation state in which the other of the accelerator pedal and the brake pedal is operated.

3. A driving assistance method comprising:
   an unable-to-drive state detection step of detecting that a driver of a vehicle is in an unable-to-drive state; and
   a stop control step of executing an automatic stop control causing the vehicle to decelerate and stop based on whether the unable-to-drive state is detected in the unable-to-drive state detection step,
   wherein the vehicle is provided with an operator configured to operate the vehicle,
   the operator includes an accelerator pedal for operating acceleration or deceleration and a brake pedal,
   the driving assistance method further comprising a step of detecting an operation state of the operator, and
   in the stop control step, canceling the execution of the automatic stop control when, in a transition to the automatic stop control or when executing the automatic stop control,
   the operation state is detected to transition from a first operation state in which the accelerator pedal or the brake pedal is operated and an angle between the accelerator pedal or the brake pedal and a floor of the vehicle is a first angle to a second operation state in which depression of the accelerator pedal or the brake pedal is released so that the angle between the accelerator pedal or the brake pedal and the floor of the vehicle becomes from a second angle larger than the first angle, and
   then the operation state is detected, within a predetermined period of time, to transition to a third operation state in which the angle between the accelerator pedal or the brake pedal and the floor of the vehicle is at a third angle smaller than the first angle.

* * * * *